United States Patent [19]

Wilson, II

[11] Patent Number: 4,743,492

[45] Date of Patent: May 10, 1988

[54] TWO LAYER COATING SYSTEM FOR POLYVINYL FLUORIDE COATINGS

[75] Inventor: Joseph D. C. Wilson, II, Wilmington, Del.

[73] Assignee: E. I. Du Pont de Nemours and Company, Wilmington, Del.

[21] Appl. No.: 876,406

[22] Filed: Jun. 20, 1986

[51] Int. Cl.[4] .................. B32B 15/08; B32B 11/04
[52] U.S. Cl. ..................... 428/216; 428/414; 428/416; 428/421; 428/463; 427/407.1; 427/409
[58] Field of Search ............... 428/216, 414, 416, 421, 428/463

[56] References Cited

U.S. PATENT DOCUMENTS

| | | | |
|---|---|---|---|
| 3,067,078 | 12/1962 | Gluch | 154/43 |
| 4,105,118 | 8/1978 | Williams, Jr. | 428/414 |
| 4,158,725 | 6/1979 | Nishimura | 526/52.1 |
| 4,314,004 | 2/1982 | Stoneberg | 428/421 |
| 4,504,642 | 3/1985 | Ohmori et al. | 428/421 X |

FOREIGN PATENT DOCUMENTS

| | | | |
|---|---|---|---|
| 0014941 | 1/1984 | Japan | 428/416 |
| 0104935 | 6/1984 | Japan | 428/416 |
| 0123654 | 7/1984 | Japan | 428/416 |

Primary Examiner—P. C. Ives

[57] ABSTRACT

A coated article comprising a primer layer and a topcoat is disclosed. The primer comprises 65-95 weight percent of an acrylic copolymer containing 1-10 weight percent repeating units of the structure

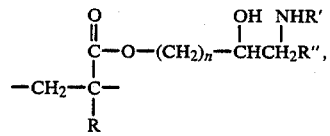

where n is 1-6, —R is —H or —CH$_3$, and R' and R" are independently H or alkyl groups having 1-6 carbon atoms, from 75-99 weight percent repeating units of the structure

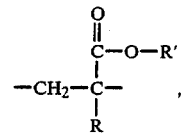

where R is —H or an alkyl group containing up to 18 carbon atoms, 0 to 15 weight percent repeating units of the structure

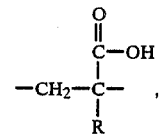

and from 5-35 weight percent of an epoxy compound of the structure

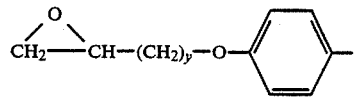

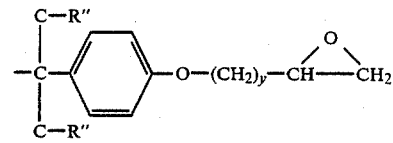

wherein —R" is —H or —F and x and y are integers of from 1-18. The topcoat is polyvinyl fluoride. The primer layer is from 0.1-0.5 mil in thickness and the topcoat is from 0.1-10.0 mils in thickness. The primer is applied, dried, and then the topcoat is applied.

3 Claims, No Drawings

TWO LAYER COATING SYSTEM FOR POLYVINYL FLUORIDE COATINGS

BACKGROUND OF THE INVENTION

1. Field of the Invention

The present invention relates to a coating system for applying polyvinyl fluoride to various substrates in which an acrylic copolymer having blended therewith a compound having terminal epoxy groups.

2. Prior Art

U.S. Pat. No. 3,067,078 discloses an adhesive for use on fluorocarbons comprising a liquid polyamide and the condensation product of epichlorohydrin and p,p'-isopropylidene diphenol.

U.S. Pat. No. 4,158,725 discloses the use of an acrylic copolymer as an adhesive for polyvinyl fluoride films. The acrylic copolymer has pendant epoxy groups which have been aminated.

U.S. Pat. No. 4,314,004 discloses a blend comprising an acrylic resin, a fluorocarbon resin and an epoxy resin for use as a primer coating composition for a topcoat blend of a fluorocarbon resin and an acrylic resin.

SUMMARY OF THE INVENTION

The present invention relates to a primer-topcoat system and process for applying it. The primer is a mixture of an acrylic resin and an epoxy compound derived from the condensation product of epichlorohydrin and bisphenol A or bisphenol AF. The topcoat is polyvinyl fluoride.

DETAILED DESCRIPTION OF THE INVENTION

The primer used in the present invention is a blend of an epoxy compound and an acrylic resin. The acrylic resin when used alone as the primer is subject to bond failure between the substrate and the primer when a polyvinyl topcoat is used and the thusly coated substrate exposed to water.

The primer used in the present invention is a solution containing 2-60 weight percent dissolved solids. The dissolved solids comprise 65-95 weight percent acrylic resin and 5-35 weight percent of an epoxy compound. The acrylic resin contains 1-10 weight percent repeating units of the structure

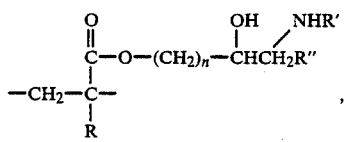

where n is 1-6, —R is H or —CH$_3$. R' is —H, —CH$_3$ or —(CH$_2$)$_m$—CH$_3$, where m is 1-5, and R" is —H, —CH$_3$ or —(CH$_2$)$_x$—CH$_3$, where x is 1-5, 75-99 weight percent repeating units of the structure

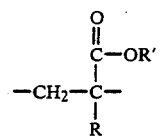

where —R' is an alkyl group containing 1-18 carbon atoms and —R has the meaning defined above and 0-15 weight percent repeating units of the structure

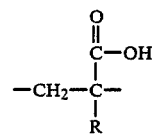

wherein —R has the meaning defined above. The primer also comprises from 5-35 weight percent, based on dissolved solids, of an epoxy compound of the formula

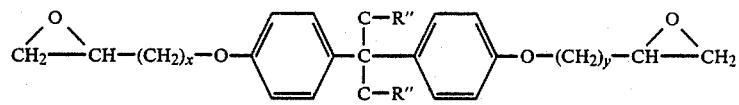

wherein —R" is —H or —F and x and y independently are integers from 1-18. The primer is applied wet as a solution in an organic solvent. Before application of the topcoat, the primer is dried so as to contain less than 5% solvent. This drying is done at 15°-150° C. for 0.001-100 hours.

The solvents used boil at from 50°-250° C. Preferably the primer on drying should be from 0.1-0.5 mils ($2.5 \times 10^{-6}$ to $12.5 \times 10^{-6}$ m).

The topcoat used herein is polyvinyl fluoride. The polyvinyl fluoride is applied as a dispersion in a polar organic solvent having a boiling point of from 100°-300° C. Generally the dispersion will contain from 5-45 weight percent polyvinyl fluoride with from 25-35 weight percent being preferred. Generally the top coat should be from 0.1-20.0 mils ($2.5 \times 10^{-6}$ to $12.5 \times 10^{-6}$ m) with 1-2 mils being preferred. The thicker topcoats tend to cause delamination of the coating when exposed to water.

Suitable substrates include aluminum, steel, terne coated steel, galvanized steel, brass, zinc alloys, etc.

The primer can be applied either as a clear or pigmented film. Pigmentation, when required may include conventional inorganic and/or organic pigments including but not limited to titanium dioxide, silica, talc, mica, metal carbonates, metal sulphates, chromates, phospho silicate composites, boro silicate composites, calcium silicate composites, aluminum triphosphates, zinc phospho oxides, barium metaborate, zinc molybdate and other nonconventional pigments including synthetic pigments such as plastic pigments, polystyrene and the like. Thus a pigmented coating may have a pigment to binder ratio of 0.005-1.5, but preferably from 0.5-1.0.

Minor levels of other conventional additives can be included in the primer or topcoat such as for example stabilizers, suspending and coalescing agents, lubricants, ultraviolet light absorbers, plasticizers, surfactants, defoamers and the like.

EXAMPLES

Example 1

A solution (44.2 g, 30% solids in toluene) of a copolymer containing 98 weight percent units derived from methyl methacrylate and 2 weight percent units of glycidyl methacrylate wherein the epoxy groups of the glycidyl methacrylate have been reacted with ammonia after polymerization (Solution A) was mixed with 2.21 g of Epon 828 (the condensation product of epichlorohydrine and p,p'-isopropylidene diphenol) and an additional 15 g of toluene added to adjust the viscosity. Films, about 0.2 mil ($5 \times 10^{-6}$ m) in thickness, were cast using a doctor knife on four clean terne plaques, and air dried overnight. A dispersion (33.3% solids) of polyvinyl fluoride in propylene carbonate was cast using a doctor knife to provide a 1 mil ($2.5 \times 10^{-5}$ m) coating over the primed placques and baked in a coalescing oven for 5 minutes at 400° F. (204° C.) and for an additional 2 minutes in air.

One-half inch ($1.27 \times 10^{-2}$ m) wide strips were cut from the plaques and the bond strength tested manually. All bonds appeared excellent. Strips were soaked in water at room temperature and tested manually for bond strength. All bonds were excellent with the film breaking clean with no peels.

EXAMPLE 2

Solution A from Example 1 (38.2 g) was mixed with 2.55 g of Epon 828 and the viscosity adjusted by mixing therewith 15 g of toluene. Films about 0.2 mil ($5 \times 10^{-6}$ m) in thickness were cast using a doctor knife on four clean terne plaques. The coatings were air dried overnight. A layer of polyvinyl fluoride about 1 mil ($2.5 \times 10^{-5}$ m) in thickness was cast with a doctor knife and dried as in Example 1. The plaques were cut into ½ inch ($1.27 \times 10^{-2}$ m) wide strips and the bond strength tested manually. All bonds were excellent. After soaking in water at room temperature all strips, the bonds remained excellent with the film breaking clean with no peels.

EXAMPLE 3

Solution A from Example 1 (20.90 g) was mixed with 1.39 g of Epon 828 and the viscosity adjusted by mixing with 8.0 g of toluene. Films of this mixture were cast on the lower ⅔ of two chromated zinc plaques and air dried overnight. The polyvinyl fluoride used in Example 1 dispersed in propylene carbonate with 33% solids was coated on the plaques and the plaques baked and dried as in Example 1. The adhesion to the primer was excellent with no adhesion to the unprimed metal. Manual pulls broke cleanly at the primer with no peel on either plaque. The plaques were soaked in water overnight. The coating on the first plaque broke cleanly with no peel on manual pull. The coating on the second plaque broke with ⅛ inch ($3.2 \times 10^{-3}$ m) peel.

EXAMPLE 4

Solution A from Example 1 (23.54 g) was mixed with 1.57 g Epon 828 and then mixed with 20.00 g toluene to adjust the viscosity. A coating of this primer was applied to two each of aluminum, Bonderite 40, and bare steel plaques. The coatings were dried at 200° F. (93° C.) for 30 minutes. The polyvinyl fluoride dispersion used in Example 3 was used to coat the above plaques as well as to coat unprimed similar plaques. The coating thicknesses are reported in Table I below.

TABLE I

| Plaque | Thickness Primer Mils | Total Mils |
| --- | --- | --- |
| Aluminum-1 | 0.2 | 1.0 |
| Aluminum-2 | 0.2 | 1.5 |
| Aluminum-3 | — | 1.5 |
| Aluminum-4 | — | 1.0 |
| Bonderite-1 | 0.2 | 1.8 |
| Bonderite-2 | 0.3 | 1.6 |
| Bonderite-3 | — | 1.7 |
| Bonderite-4 | — | 1.5 |
| Steel-1 | 0.3 | 1.5 |
| Steel-2 | 0.3 | 1.6 |
| Steel-3 | — | 1.4 |
| Steel-4 | — | 1.4 |

Adhesion tests were run on -1 and -3 panels. The results are reported in Table II.

TABLE II

| Plaque | Tape Adhesion % Removed | Hand Pull |
| --- | --- | --- |
| Aluminum-1 | 0 | Not Peelable |
| Aluminum-3 | — | Peels Readily |
| Borderite-1 | 0 | Not Peelable |
| Borderite-3 | 100 | Peels Readily |
| Steel-1 | 0 | Not Peelable |
| Steel-3 | 100 | Peels Readily |

I claim:

1. A composite comprising a metal substrate, intimately adhered to said substrate a layer from 0.1–0.5 mil in thickness which is a blend comprising 65–95 weight percent of a copolymer comprising 1–10 weight percent repeating units of the structure

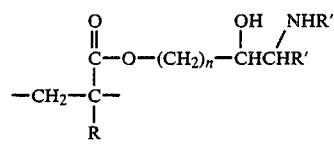

where n is 1–6, —R is —H or —CH$_3$, and —R' and R' are independently H or alkyl groups having 1–6 carbon atoms, 75–99 weight percent repeating units of the structure

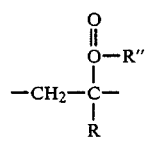

where —R" is an alkyl group having 1–18 carbon atoms, and 0–15 weight percent repeating units of the structure

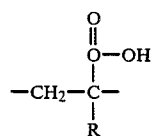

with 5–35 weight percent of an epoxy compound of the structure

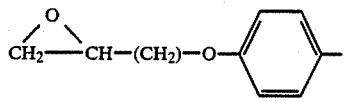
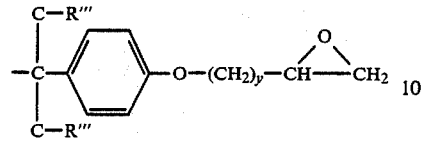
where —R''' is —H or —F and x and y are independent integers from 1–18; and a topcoat from 0.1–30 mils in thickness which consists essentially of polyvinyl fluoride.
2. The composite of claim 1 wherein the epoxy compond is
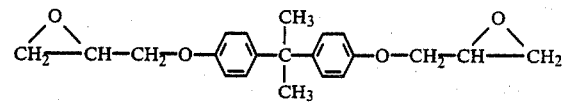
3. The composite of claim 2 wherein the topcoat is from 0.01–2 mils in thickness.
* * * * *